July 13, 1926.
W. B. MURDEN
1,592,149
STRAINER
Filed April 6, 1925    2 Sheets-Sheet 1
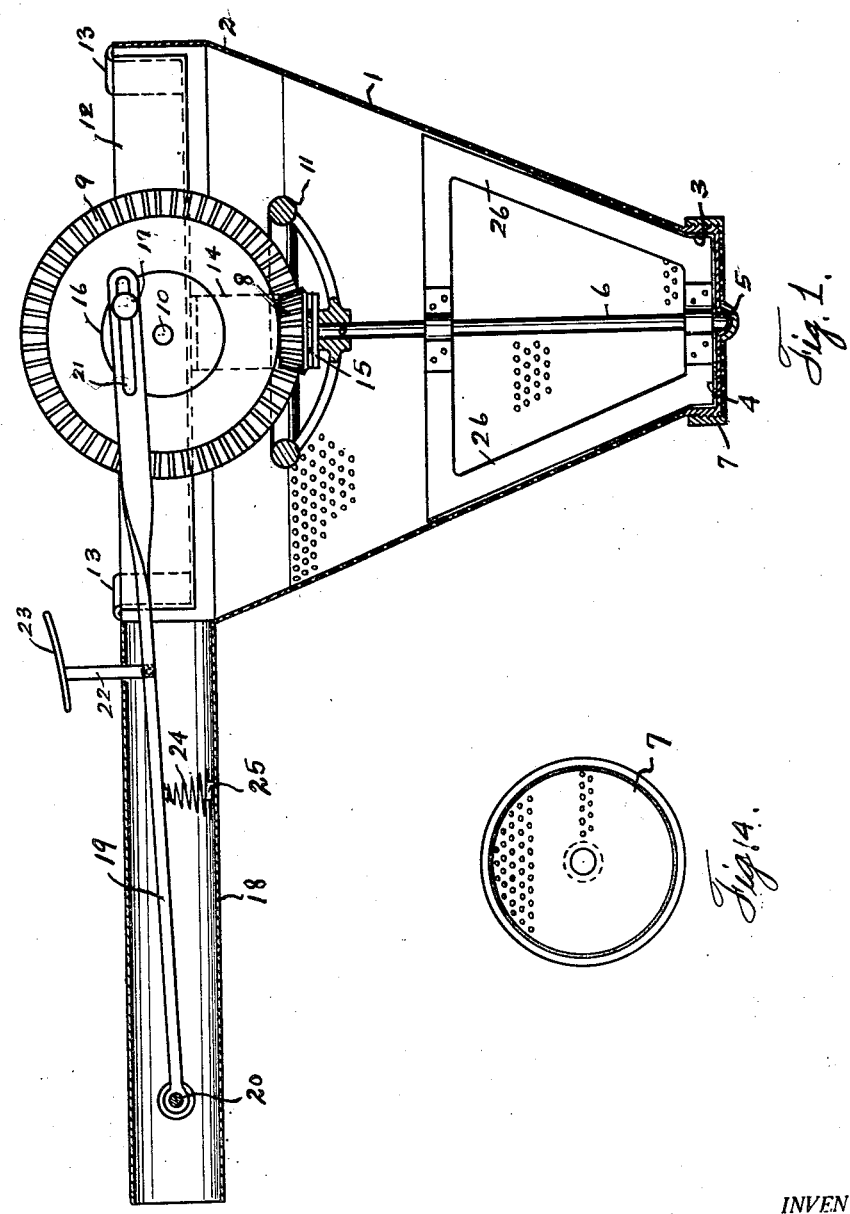
INVENTOR.
William Badison Murden
BY
Hardway & Cathey
ATTORNEYS

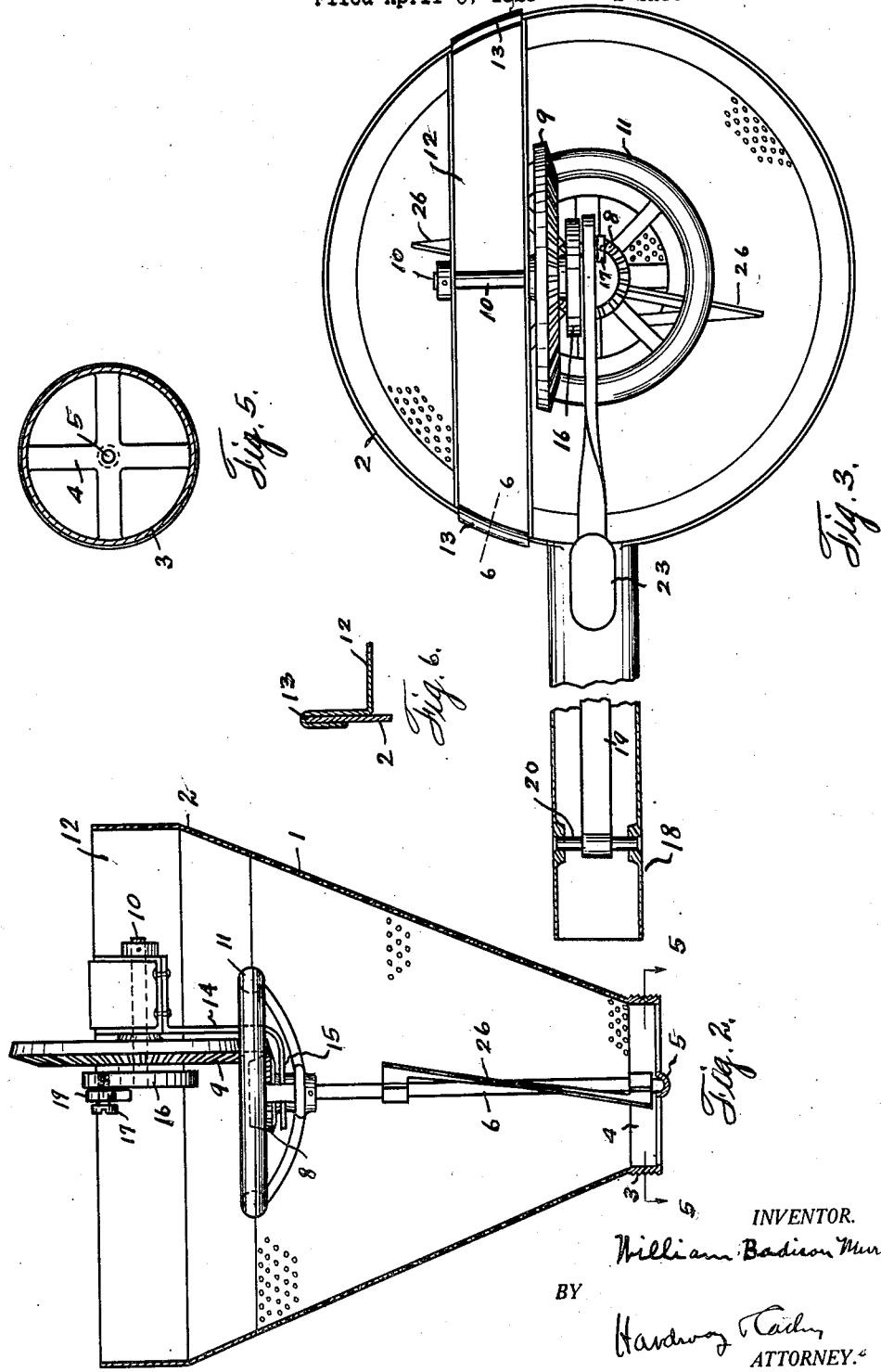

Patented July 13, 1926.

1,592,149

UNITED STATES PATENT OFFICE.

WILLIAM BADISON MURDEN, OF PORT NEWARK, NEW JERSEY.

STRAINER.

Application filed April 6, 1925. Serial No. 21,188.

This invention relates to new and useful improvements in strainers.

One object of this invention is to provide a strainer specially designed for use in straining liquid ingredients of soups, and other liquid foods, into the cooker, and has been designed so that its contents may be stirred by the hand holding the strainer to facilitate the straining process and leaving the other hand of the cook free to stir the contents of the cooking pan or pot or other utensil.

Another object of the invention is to provide a strainer of the character described which is also adapted for general straining purposes.

With the above and other objects in view this invention has particular relation to certain novel features of construction, operation and arrangement of parts, an example of which is given in this specification and illustrated in the accompanying drawings, wherein:—

Figure 1 shows a vertical sectional view of the complete strainer.

Figure 2 shows a transverse sectional view thereof.

Figure 3 shows a plan view, partly in section.

Figure 4 shows a bottom view of the lower end cap.

Figure 5 shows a horizontal sectional view taken on the line 5—5 of Figure 2, and Figure 6 shows a fragmentary sectional view taken on the line 6—6 of Figure 3.

Referring now more particularly to the drawings, wherein like numerals of reference designate similar parts in each of the figures, the numeral 1 designates the strainer body, which is formed of wire mesh, or other foraminated material, and, in form, is of a general inverted conical shape. There is a comparatively wide rim of sheet metal 2 forming the upper part of the body and which is soldered, or otherwise secured to the foraminated walls of the body.

Soldered, or otherwise secured, to the bottom of the strainer body there is an outwardly threaded, annular collar 3, which supports the spider 4, and said spider has a central bearing 5 to support the lower end of the vertical paddle shaft 6. There is a lower end cap 7, formed of foraminated material, which is internally threaded, and adapted to be screwed onto the collar 3.

The vertical paddle shaft has a pinion 8, fixed on its upper end, and in mesh with a bevel gear wheel 9, fixed on the inner end of the transverse shaft 10. The paddle shaft 6, also has a momentum wheel 11 fixed thereon, adjacent the pinion 8.

There is a bridge 12, formed of sheet metal, channel like, and having its ends formed into clamps 13, 13 which engage over the upper edge of the rim 2, said bridge spanning the strainer.

The shaft 10 has bearings in the side walls of said bridge, and a bracket 14 is secured to the bridge and its lower end is overturned and formed into a bearing 15, for the upper end of the paddle shaft 6.

The inner end of the shaft 10 has a disc 16, secured thereto and provided with a removable, eccentric wrist pin 17, secured thereto.

A tubular handle 18 is secured to the rim 2, and an operating lever 19 has its outer end pivoted on the cross pin 20, anchored within the handle.

The other end has an oblong bearing 21 in which the wrist pin 17 works. Attached to said lever, and working through a suitable bearing in the handle, there is an upstanding rod 22 whose upper end carries the thumb plate 23. The lever 19 is seated on the coil spring 24, whose upper end is attached to the lever, and whose lower end is free and flared and surrounds the upstanding guide stud 25, fixed to the inside of the handle and provided to prevent the displacement of the lower end of the spring.

By manipulating the lever 19 through the thumb plate 23, the gear 9 may be rotated, and the shaft 6 correspondingly turned. Fixed to this shaft 6 there is a paddle 26 having slightly spiralled wings of a form to sweep around the foraminated body 1 close to the walls and bottom thereof, thus stirring the contents of the strainer and facilitating the flow of said contents through the strainer. The central parts of the wings are cut away so that they will more readily pass through said contents and better agitate the same.

The strainer may be cleansed by immersing the same in hot water and rapidly rotating the paddles, or by removing the wrist-pin 8 and lifting off the operating mechanism, and removing the cap 7 and cleaning the parts separately.

What I claim is:—

1. A strainer including a receptacle whose walls are foraminated a handle attached to the receptacle, a vertical paddle shaft fixed thereon having spiralled wings, and means for rotating said shaft, said means including a rotary member operatively connected with said shaft, an eccentric wrist pin carried by said member, an operating lever pivoted at one end to the handle and whose other end has a bearing in which said wrist pin works.

2. A stainer including a receptacle whose walls are foraminated, a removable foraminated bottom end cap on said receptacle, a removable bridge-like support carried by the top of the receptacle, a vertical shaft in the receptacle, a paddle fixed thereon, a crank member operatively connected with the paddle shaft, an eccentric wrist pin carried thereby, a handle for the receptacle, a lever pivoted at one end to said handle, and operatively connected at its other end to said wrist pin.

3. A strainer including a receptacle whose walls are foraminated, a removable foraminated bottom end cap on said receptacle, a removable bridge-like support carried by the top of the receptacle, a vertical shaft in the receptacle, a paddle fixed thereon, a crank member operatively connected with the paddle, an eccentric wrist pin carried thereby, a handle for the receptacle, a lever pivoted at one end to said handle, and operatively connected at its other end to said wrist pin and a yieldable seat sustaining said lever.

4. A strainer including a receptacle whose walls are foraminated, a removable foraminated bottom end cap on said receptacle, a removable bridge-like support carried by the top of the receptacle, a vertical shaft in the receptacle, a paddle fixed thereon, a crank member operatively connected with the paddle shaft, an eccentric wrist pin carried thereby, a handle for the receptacle, a lever pivoted at one end to said handle and operatively connected at its other end to said wrist pin and a pressure plate carried by said lever through which the same may be operated.

5. A strainer including a receptacle whose walls converge downwardly and are foraminated, a removable foraminated bottom end cap on said receptacle and having a central bearing, a removable bridge-like support carried by the top of the receptacle, a vertical shaft in the receptacle, whose lower end works in said bearing, a paddle fixed thereon, a crank member journaled in the bridge-like supports and geared to the paddle shaft, a handle for the receptacle and means connected to the crank shaft whereby the same may be rotated and rotation thereby imparted to the paddle shaft.

In testimony whereof I have signed my name to this specification.

WILLIAM BADISON MURDEN.